United States Patent [19]
Kranawetter

[11] Patent Number: 5,963,267
[45] Date of Patent: Oct. 5, 1999

[54] DELAY CORRECTION CIRCUIT

[75] Inventor: Greg Alan Kranawetter, Indianapolis, Ind.

[73] Assignee: Thomson Consumer Electronics, Inc., Indianapolis, Ind.

[21] Appl. No.: 08/717,093

[22] Filed: Sep. 20, 1996

[51] Int. Cl.⁶ .................................................. H04N 5/04
[52] U.S. Cl. .......................................... 348/537; 358/409
[58] Field of Search .................................. 348/533, 535, 348/537, 540, 510, 512, 513, 514; 358/386, 13, 20, 382, 90

[56] References Cited

U.S. PATENT DOCUMENTS

| | | | |
|---|---|---|---|
| 3,763,317 | 10/1973 | Coleman, Jr. et al. | 327/154 |
| 4,301,417 | 11/1981 | Jansen et al. | 329/310 |
| 4,595,953 | 6/1986 | Willis | 348/516 |
| 4,638,360 | 1/1987 | Christopher et al. | 348/537 |
| 4,667,240 | 5/1987 | Willis et al. | 358/167 |
| 4,668,999 | 5/1987 | De La Cierva, Sr. et al. | 386/4 |
| 5,309,111 | 5/1994 | McNeely et al. | 327/7 |
| 5,717,469 | 2/1998 | Jennes et al. | 348/571 |

*Primary Examiner*—John K. Peng
*Assistant Examiner*—D.C. Peter Chu
*Attorney, Agent, or Firm*—Joseph S. Tripoli; Peter M. Emanuel; Robert D. Shedd

[57] ABSTRACT

A delay correction circuit includes a source of a clock signal and a source of a timing signal asynchronous with the clock signal. A timing signal detector is responsive to the clock signal and the timing signal, and is properly operative only when the timing signal is stable for a predetermined time period around the clock signal. A control circuit conditions utilization circuitry to operate after a delay time after the timing signal is detected. Adjusting circuitry conditions the control circuit to adjust the delay time if the timing signal was not stable within the predetermined time period.

11 Claims, 6 Drawing Sheets

DELAY CORRECTION CIRCUIT

FIELD OF THE INVENTION

The present invention relates to a processing circuit which is enabled a predetermined delay period after a timing signal is detected, and in particular to a circuit for correcting the delay period in cases when the timing signal may be detected incorrectly.

BACKGROUND OF THE INVENTION

Digital video signal processing circuitry generally samples a video signal in response to a clock signal which is synchronized to one synchronization component of the video signal. For example, in a standard NTSC video signal, the video signal may be sampled by a clock synchronized to the color burst signal and having a frequency of four times the color burst signal frequency (termed a burst-locked clock). In a standard NTSC video signal, such a sample clock signal has 910 pulses in one horizontal line. While the phase of such a sample clock signal is independent of the phase of the line (e.g. horizontal) synchronization component, the phase difference between them remains constant.

However, digital video signal processing circuits often must process non-standard video signal. In these signals, the phase difference between the burst locked clock and the line synchronization component varies from line to line. This situation can occur in video cassette recorders and/or video disc players in which the recording medium is affected with mechanical jitter on playback. The effects are exacerbated in processing circuits which store frames of digital video data for functions such as noise reduction and frame comb luminance/chrominance component separation, and features such as freeze frame and picture-in-picture.

To perform such functions, and provide such features, it is required to process samples from spatially aligned raster locations in adjacent frames. That is, the two samples must be from the same line in each frame, and have the same time delay from the horizontal synchronization signal in that line. However, because of the phase changes between the burst locked sample clock and the horizontal synchronization signal from line to line and frame to frame, as described above, a sample in a line of one frame will not necessarily be spatially aligned with a sample in the same line in the previous frame.

It is known to calculate the phase difference (termed skew) between the burst clock signal and the horizontal synchronization signal in each line. (See U.S. Pat. No. 5,309,111, "Apparatus for Measuring Skew Timing Errors," issued May 3, 1994 to McNeely et al., incorporated by reference.) It is also known to interpolate between two samples in a line of one frame to generate an interpolated sample which is spatially aligned (i.e. at the same delay from the horizontal synchronization signal) with a sample in that same line of the previous frame, using the difference in skew between the two lines as the interpolation parameter. This interpolated sample is then processed, along with the sample from the previous frame, to provide the functions and features described above. (See U.S. Pat. No. 4,667,240, "Timing Correction Circuitry as for TV Signal Recursive Filters," issued May 19, 1987 to Willis et al., incorporated by reference.) It is also known to store only visible samples (i.e. non-blank samples) in the frame store to minimize the required capacity of the frame store. Thus, in such systems, the taking and storing of video samples is delayed from the horizontal synchronization signal by a period substantially equal to the horizontal blanking interval.

Figure 1:
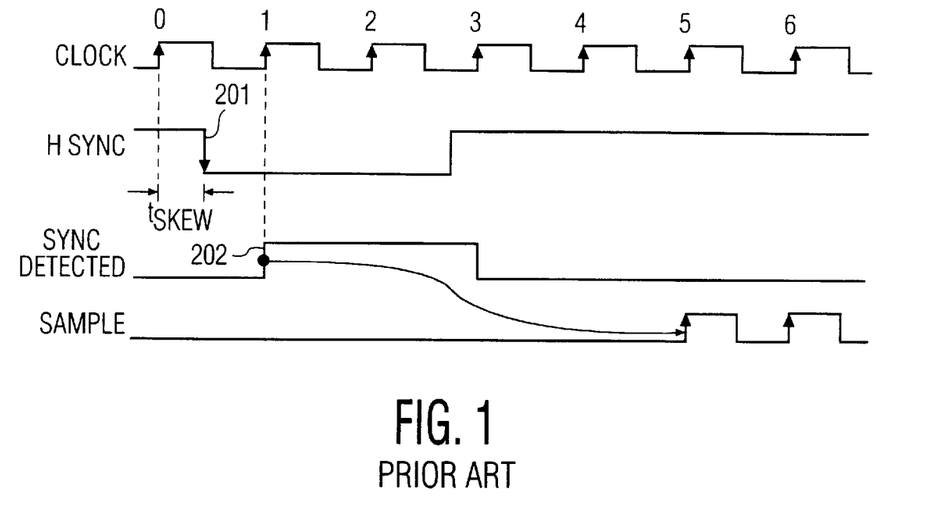
FIGS. 1, 2 and 3 are waveform diagrams illustrating how an uncertainty condition can arise.
Figure 2:
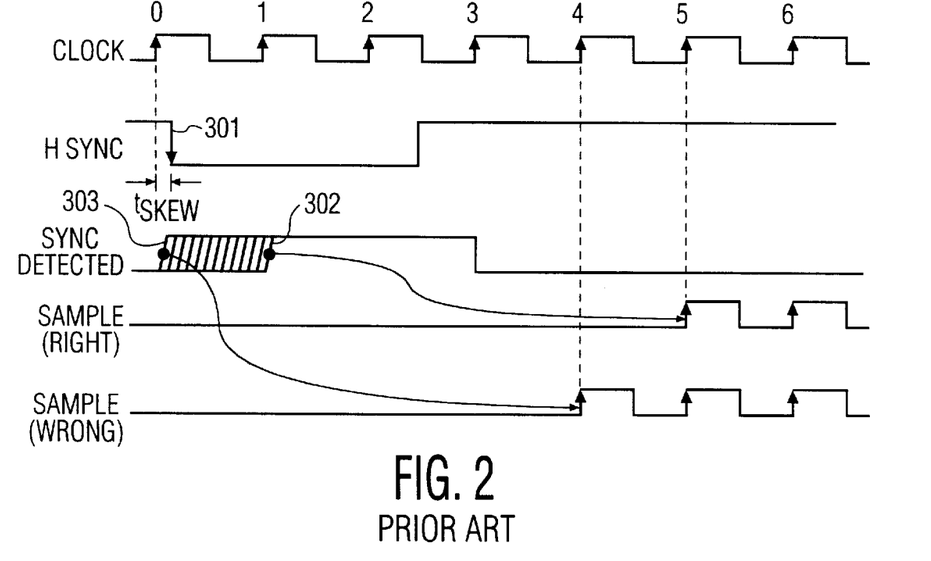
Figure 3:
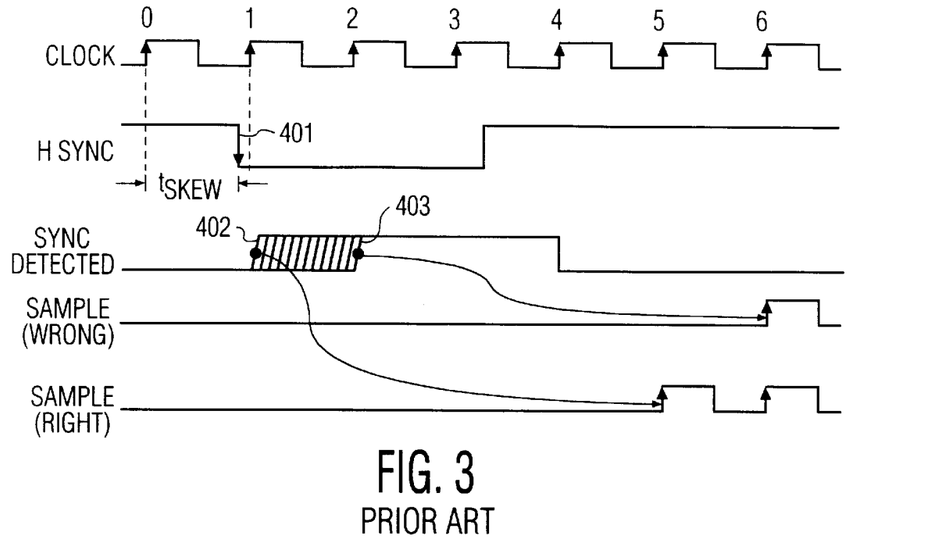

Such systems use a logic gate, or flip-flop, responsive to the horizontal synchronization signal, and clocked by the burst locked clock, to detect the horizontal synchronization signal. FIGS. 1, 2 and 3 are waveform diagrams illustrating how an uncertainty condition can arise in such systems. In FIG. 1, the topmost waveform, CLOCK, illustrates the burst locked clock near the start of a horizontal line. The second waveform, H SYNC, illustrates the horizontal synchronization signal for the horizontal line. As can be seen, the leading edge 201 (negative going) of the horizontal synchronization signal occurs nearly at the middle (i.e. near the negative going transition) of cycle 0 of the burst locked clock, CLOCK. The third waveform, SYNC DETECTED, represents the output of the horizontal synchronization signal detector, which may, for example, be a flip-flop. The SYNC DETECTED signal goes high 202 at the leading edge of cycle 1 of the burst locked clock, CLOCK, after the leading edge 201 of the horizontal synchronization signal H SYNC. The fourth waveform, SAMPLE, illustrates the sample clock. The sample clock begins on the fourth cycle of the burst locked clock CLOCK after the horizontal synchronization signal H SYNC was detected 202, which in the illustrated embodiment is assumed to be the beginning of the visible samples. In an actual embodiment, the number of burst locked clock cycles from the detection of the horizontal synchronization signal to the first visible video sample may be different. One skilled in the art will understand how to adjust the delay appropriately.

Logic circuits such as the flip-flop forming the horizontal synchronization signal detector, generally are guaranteed to operate properly only if the signal being sampled (in this case, the horizontal synchronization signal) is stable from a predetermined time before a transition of the clock signal (in this case, the burst locked clock signal) called the set-up time, through a predetermined time after the transition of the clock signal called the hold-time. Otherwise, the operation of that logic device is unstable. However, as described above, the phase of the horizontal synchronization signal is independent of the phase of the burst clock signal, so it cannot be guaranteed that the horizontal synchronization signal remains stable during the set-up and hold-times.

In cases when the horizontal synchronization signal is not stable during the set-up and hold-times, the logic gate or flip-flop may operate properly to detect the horizontal synchronization signal, or it may not. Thus, under this condition, there can be a one clock period uncertainty in the detection of the horizontal synchronization signal. Consequently, there can be a one clock period uncertainty in determining the first visible sample to be taken and stored. This means it is possible to process samples in successive frames which are spatially displaced one pixel in the raster, which seriously degrades the accuracy of such processing.

FIG. 2 illustrates one combination of burst locked clock and horizontal synchronization signal timing which may result in the uncertainty described above. In FIG. 2, the leading edge 301 of the horizontal synchronization signal, H SYNC, occurs just after a leading edge of cycle 0 of the burst locked clock, CLOCK. The horizontal synchronization signal, H SYNC, should be detected at clock cycle 1 of the leading edge of the burst locked, which is the next clock cycle following the leading edge 301 of the horizontal synchronization component H SYNC, as illustrated by rising edge 302 of the SYNC DETECTED signal. In turn, the sample clock should not begin until four clock cycles after that, or clock pulse 5, as shown in the fourth waveform, SAMPLE(RIGHT).

However, in this case, the horizontal synchronization signal H SYNC is not stable during the hold time of the flip flop at clock pulse 0. Thus, the flip flop may produce either a 'high' or 'low' signal at its output terminal, SYNC DETECTED, in response to cycle 0 of the burst locked clock, CLOCK. This is illustrated in FIG. 2 by the series of diagonal lines at the leading edge of the SYNC DETECTED signal. If the flip flop erroneously produces a 'high' signal at the SYNC DETECTED output terminal in response to clock pulse 0, generating leading edge 303, then the sample clock SAMPLE will erroneously begin four cycles later at burst locked clock cycle 4. This is illustrated in FIG. 2 on the fifth waveform SAMPLE(WRONG).

FIG. 3 illustrates another combination of burst locked clock and horizontal synchronization signal timing which may result in the uncertainty described above. In FIG. 3, the leading edge 401 of the horizontal synchronization signal, H SYNC, occurs just before the leading edge of cycle 1 of the burst clock, CLOCK. In this case, as well, the horizontal synchronization signal H SYNC should be detected by clock pulse 1, as illustrated by rising edge 402 of the SYNC DETECTED signal. In turn, the sample clock should begin four clock cycles after that, or clock pulse 5, as shown in the fifth waveform, SAMPLE(RIGHT).

However, in this case, the horizontal synchronization signal H SYNC is not stable during the setup time of the flip flop at clock pulse 1. Thus, the flip flop may produce either a 'high' or 'low' signal at its output terminal, SYNC DETECTED, in response to cycle 1 of the burst locked clock CLOCK. This is illustrated in FIG. 3 by the series of diagonal lines at the leading edge of the SYNC DETECTED signal. If the flip flop does not produce a 'high' signal at the SYNC DETECTED output terminal in response to cycle 1 of the burst locked clock CLOCK, generating leading edge 402, then the horizontal synchronizing signal H SYNC will not be detected until cycle 2 of the burst locked clock, CLOCK, as illustrated by leading edge 403 of the SYNC DETECTED signal. In this case, the sample clock SAMPLE will erroneously begin four cycles later at burst locked clock CLOCK cycle 6. This is illustrated in FIG. 3 on the fourth waveform SAMPLE(WRONG).

It is desirable that the location of the horizontal synchronization signal be accurately detected so that the spatial locations of the samples taken in relation to that signal can be located accurately. In this manner the frame processing will process corresponding samples and maintain the required accuracy of processing.

BRIEF DESCRIPTION OF THE INVENTION

In accordance with principles of the present invention, a delay correction circuit includes a source of a clock signal and a source of a timing signal asynchronous with the clock signal. A timing signal detector is responsive to the clock signal and the timing signal, and is properly operative only when the timing signal is stable for a predetermined time period around the clock signal. A control circuit conditions utilization circuitry to operate after a delay time after detection of the timing signal. Adjusting circuitry conditions the control circuit to adjust the delay time if the timing signal was not stable within the predetermined time period.

DESCRIPTION

Figure 4:
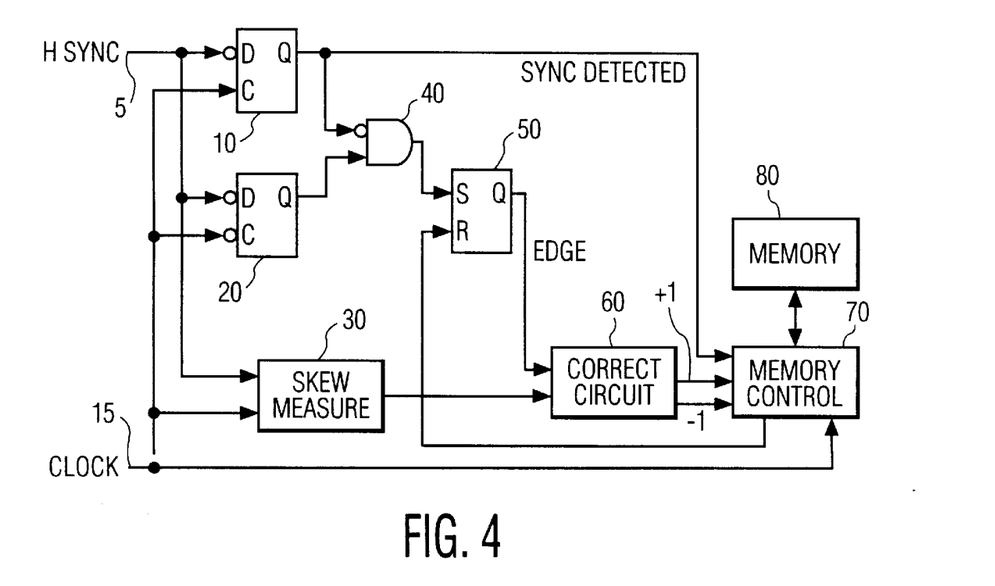
FIG. 4 is a block diagram of a circuit for correcting for the uncertainty condition illustrated in FIGS. 1, 2 and 3.

FIG. 4 is a block diagram of a circuit for correcting for the uncertainty condition illustrated in FIGS. 1, 2 and 3. In FIG. 4, only those elements necessary for understanding the operation of the present invention are illustrated. One skilled in the art will understand what other elements are required, how to design and fabricate those elements, and how to interconnect those elements with the elements illustrated in FIG. 4.

In FIG. 4, a source (not shown) of a horizontal synchronization component signal H SYNC is coupled to a first input terminal 5, and a source (also not shown) of a burst locked clock signal CLOCK is coupled to a second input terminal 15. Input terminal 5 is coupled to respective inverting D input terminals of a first D flip-flop 10 and a second D flip-flop 20, and to a first input terminal of a skew measuring circuit 30. Input terminal 15 is coupled to a clock input terminal C of the first D flip-flop 10, an inverted clock input terminal C of the second D flip-flop 20, a second input terminal of the skew measuring circuit 30, and a clock signal input terminal of a memory control circuit 70. A Q output terminal of the first D flip-flop 10 produces the SYNC DETECTED signal and is coupled to an inverting input terminal of an AND gate 40, and a corresponding input terminal of the memory control circuit 70. A Q output terminal of the second flip-flop 20 is coupled to a non-inverting input terminal of the AND gate 40.

An output terminal of the AND gate 40 is coupled to a set input terminal S of an S-R flip-flop 50. A Q output terminal of the S-R flip-flop 50, produces a signal representing which edge (rising or failing) of the burst locked clock signal CLOCK first detected the horizontal synchronization signal H SYNC, and is coupled to a first input terminal of a correction logic circuit 60. An output terminal of the skew measuring circuit 30 is coupled to a second input terminal of the correction logic circuit 60. First and second output terminals of the correction logic circuit 60 produce respective signals indicating whether the burst clock cycle count from the detected horizontal synchronization signal to the first visible sample should be incremented or decremented, and are coupled to corresponding input terminals of the memory control circuit 70. A bidirectional terminal of the memory control circuit 70 is coupled to the frame store memory 80. A control output terminal of the memory control circuit 70 is coupled to the reset input terminal of the S-R flip-flop 50.

Figure 5:
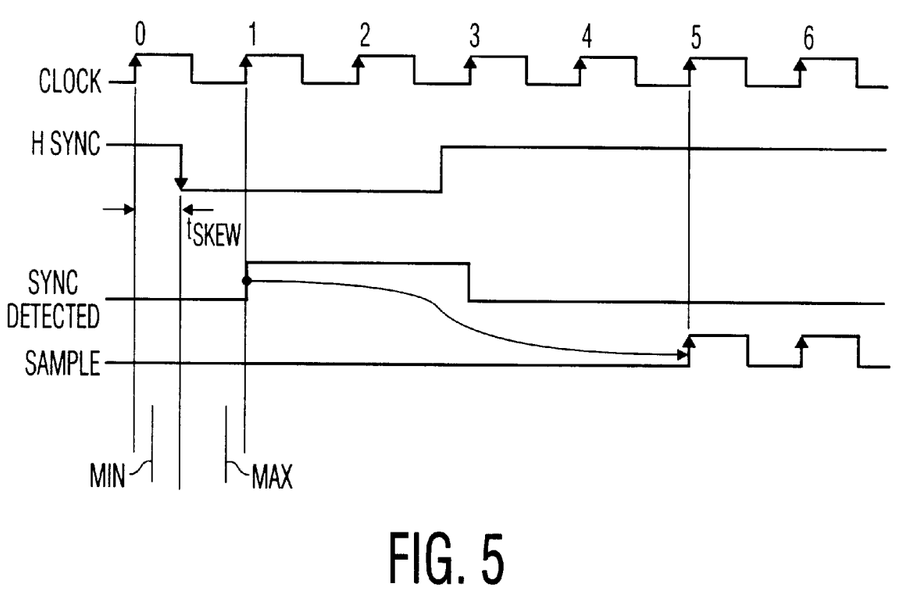
FIGS. 5, 6 and 7 are waveform diagrams illustrating the operation of the correction circuit illustrated in FIG. 3.

FIG. 5 is a waveform diagram, useful in understanding the operation of the correction circuit illustrated in FIG. 3, which should be referred to in the discussion below. In operation, both of the first and second flip-flops 10 and 20, and the S-R flip flop 50, begin in the reset state, in which the Q output terminals produce logic '0' signals. The first D flip-flop 10 operates to detect the horizontal synchronization signal H SYNC at leading edges of the burst locked clock signal CLOCK, and produce the SYNC DETECTED signal, all in a known manner. The SYNC DETECTED signal produced by the first flip-flop 10 is subject to the uncertainty condition illustrated in FIGS. 1, 2 and 3. The second D flip-flop operates to detect the horizontal synchronization signal H SYNC at trailing edges of the burst locked clock signal CLOCK.

If a leading edge of the horizontal synchronization signal H SYNC is first detected by the leading edge detector flip-flop 10, it produces a logic '1' SYNC DETECTED signal at its Q output terminal, which disables the AND gate 40. The SYNC DETECTED signal conditions the memory controller circuit 70 to begin counting cycles of the burst locked clock signal, CLOCK, until the first visible sample is to be taken. The Q output terminal of the S-R flip-flop 50, in turn, continues to produce a logic '0' signal, which indicates that the horizontal synchronization signal H SYNC was detected on the leading edge of the burst locked clock signal CLOCK. If the horizontal synchronization signal H SYNC is first detected by the trailing edge detector flip-flop 20, it produces a logic '1' signal at its Q output terminal. The AND gate 40 passes the logic '1' signal to the set input terminal S of the S-R flip-flop 50. In response, the S-R flip-flop 50 enters the set state, in which the Q output terminal produces a logic '1' signal, which indicates that the horizontal synchronization signal H SYNC was detected on the trailing edge of the burst locked clock CLOCK.

The skew measuring circuit 30 operates in a known manner (see U.S. Pat. No. 5,309,111) to produce a signal indicating the amount of skew between the horizontal synchronization signal H SYNC and the burst locked clock signal CLOCK, expressed as a fraction of a cycle of the burst locked clock signal, CLOCK. As described above, the uncertainty condition occurs when the leading edge of the horizontal synchronization signal H SYNC occurs within the set-up and hold times of the leading edge of the burst locked clock signal CLOCK. As shown in FIGS. 2 and 3, the skew $t_{SKEW}$ (expressed as a fraction of a cycle) for this condition is either close to zero, or close to one. If, on the other hand, the leading edge of the horizontal synchronization signal H SYNC is not close to a leading edge of the burst locked clock signal CLOCK, then there is no uncertainty condition. As shown in FIG. 5, a minimum MIN and a maximum MAX value for the skew $t_{SKEW}$ are specified. If the skew $t_{SKEW}$ is greater than the specified minimum MIN, and less than the specified maximum MAX, then the horizontal synchronization signal H SYNC may be detected in the normal manner at the next leading edge of the burst clock signal CLOCK.

Referring to FIG. 4, the skew measuring circuit 30 produces a signal representing the measured skew expressed as a fraction of a cycle. In a preferred embodiment, the skew is expressed in 16ths of a cycle. The minimum skew value MIN is specified to be $2/16$ths, and the maximum skew value MAX is specified to be $14/16$ths of a cycle of the burst locked clock signal, CLOCK. If the skew is greater than $2/16$ths, and less than $14/16$ths, then the correction logic circuit 60 generates logic '0' signals on both the +1 output terminal and the −1 output terminal. In response, the memory controller 70 operates in a normal manner to count four cycles of the burst locked clock after the SYNC DETECTED signal, before storing the first visible sample in the frame store memory 80.

Figure 6:
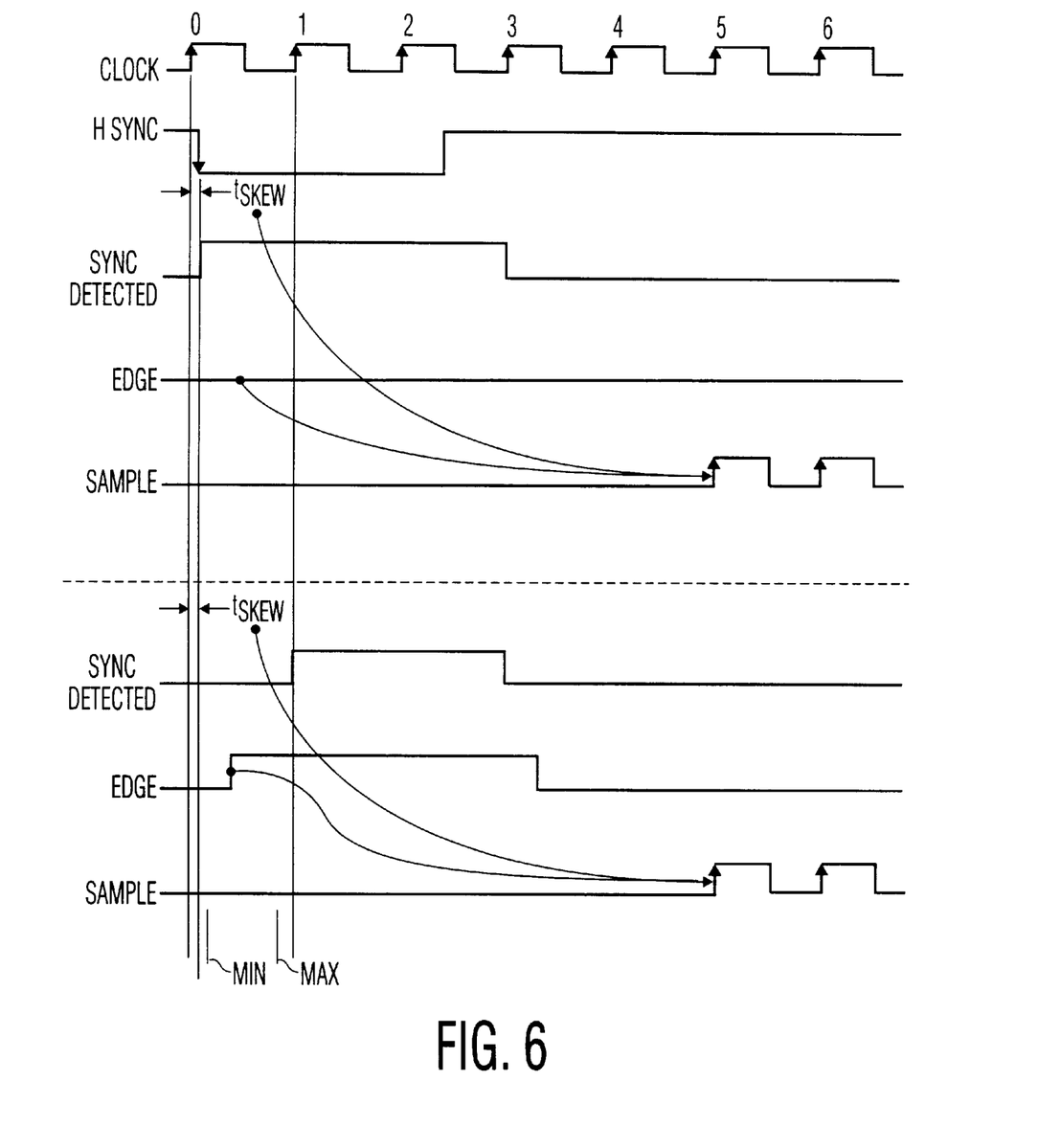

FIG. 6 is a waveform diagram illustrating the operation of the correction circuit illustrated in FIG. 4 under one uncertainty condition. In FIG. 6, the skew $t_{SKEW}$ is less than the minimum skew MIN. This means that the horizontal synchronization signal H SYNC may not be stable through the hold time of the leading edge detector flip-flop 10. It also means that the horizontal synchronization signal H SYNC should be first detected at the falling edge of the burst locked clock signal CLOCK, and that the SYNC DETECTED signal should properly be detected at cycle 1 of the burst locked clock signal, CLOCK.

The upper half of FIG. 6 illustrates the condition when the SYNC DETECTED signal is generated improperly by the leading edge detector flip-flop 10 at cycle 0 of the burst locked clock signal CLOCK. Referring to FIG. 4, this disables the AND gate 40, and the EDGE signal at the output of the S-R flip flop 50 remains at a logic '0', indicating that the horizontal synchronization signal H SYNC was first detected by the leading edge detector flip-flop 10. The correction logic circuit 60 receives the skew signal from the skew measuring circuit 30, and determines that the skew $t_{SKEW}$ is less than the specified minimum MIN. It also receives the logic '0' EDGE signal from the S-R flip-flop 50 indicating that the horizontal synchronization signal H SYNC was first detected by the leading edge detector flip-flop 10. This combination means that the number of burst locked clock signal cycles until the first visible sample must be incremented. In the illustrated embodiment, five clock cycles must be counted, instead of four. The correction logic circuit 60 generates a logic '1' signal on the +1 output terminal, and a logic '0' signal on the −1 output terminal. In response to this signal, the memory control circuit 70 counts five cycles of the burst locked clock signal CLOCK before storing the first visible sample.

The lower half of FIG. 6 illustrates the condition where the SYNC DETECTED signal is generated properly by the leading edge detector flip-flop 10 at cycle 1 of the burst locked clock signal CLOCK. Referring to FIG. 4, in this case, the trailing edge detector flip-flop 20 first detects the horizontal synchronization signal H SYNC at the trailing edge of cycle 0 of the burst locked clock signal CLOCK. In response, the trailing edge detector flip-flop 20 generates a logic '1' signal at its Q output terminal. This signal passes through the AND gate 40, and conditions the S-R flip-flop to enter the set state, in which the EDGE signal becomes a logic '1' signal. The correction logic circuit 60 receives the skew signal from the skew measuring circuit 30 and determines that it is less than the specified minimum MIN. It also receives the logic '1' EDGE signal from the S-R flip-flop 50 indicating that the horizontal synchronization signal H SYNC was first detected by the trailing edge detector flip-flop 20. This combination means that the count of burst locked clock signal CLOCK cycles until the first visible sample need not be adjusted, and that the normal four cycles is correct. The correction logic circuit 60, thus generates logic '0' signals on both the +1 and −1 output signal. In response, the memory control circuit 70 count four cycles of the burst locked clock signal CLOCK before storing the first visible sample. In any event, when the memory control circuit 70 has received the +1 and −1 output signals from the correction circuit 60, it generates a control signal which conditions the S-R flip-flop 50 to resume the reset condition so that it is ready to properly detect the next horizontal synchronization signal H SYNC.

Figure 7:
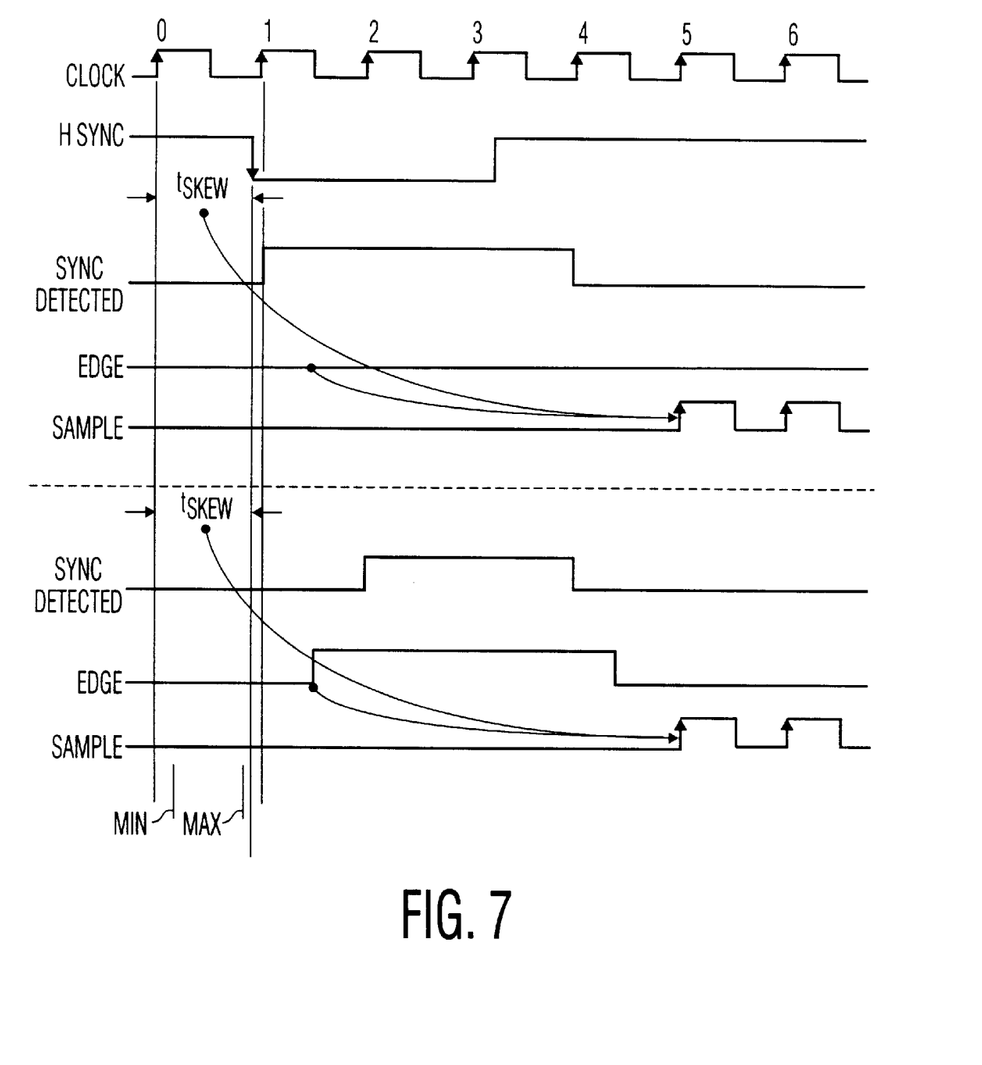

FIG. 7 is a waveform diagram illustrating the operation of the correction circuit illustrated in FIG. 4 under the other uncertainty condition. In FIG. 7, the skew $t_{SKEW}$ is greater than the maximum skew MAX. This means that the horizontal synchronization signal H SYNC may not be stable during the set-up time of the leading edge detector flip-flop 10. It also means that the horizontal synchronization signal H SYNC should be first detected at the leading edge of the burst locked clock signal CLOCK, and that the horizontal synchronization signal H SYNC should properly be detected at clock cycle 1.

The upper half of FIG. 7 illustrates the condition when the SYNC DETECTED signal is generated properly by the leading edge detector flip-flop 10 at cycle 1 of the burst locked clock signal CLOCK. Referring to FIG. 4, this disables the AND gate 40, and the EDGE signal at the output of the S-R flip flop 50 remains at a logic '0', indicating that the horizontal synchronization signal H SYNC was first detected by the leading edge detector flip-flop 10. The correction logic circuit 60 receives the skew signal from the skew measuring circuit 30, and determines that the skew $t_{SKEW}$ is greater than the specified maximum MAX. It also receives the logic '0' EDGE signal from the S-R flip-flop 50 indicating that the horizontal synchronization signal H SYNC was first detected by the leading edge detector flip-flop 10. This combination means that the count of burst locked clock signal CLOCK cycles until the first visible sample need not be adjusted, and the normal four cycles is correct. The correction logic circuit 60, thus generates logic '0' signals on both the +1 and −1 output terminals. In response, the memory control circuit 70 counts four cycles of the burst locked clock signal CLOCK before storing the first visible sample.

The lower half of FIG. 7 illustrates the condition where the SYNC DETECTED signal is generated improperly by the leading edge detector flip-flop 10 at cycle 2 of the burst locked clock signal CLOCK. Referring to FIG. 4, in this case, the trailing edge detector flip-flop 20 first detects the horizontal synchronization signal H SYNC at the trailing edge of cycle 1 of the burst locked clock signal CLOCK. This signal passes through the AND gate 40, and conditions the S-R flip-flop to enter the set state, in which the EDGE signal becomes a logic '1' signal. The correction logic circuit 60 receives the skew signal from the skew measuring circuit 30 and determines that it is greater than the specified maximum MAX. It also receives the logic '1' EDGE signal from the S-R flip-flop 50 indicating that the horizontal synchronization signal H SYNC was first detected by the trailing edge detector flip-flop 20. This combination means that the count of burst locked clock signal CLOCK cycles until the first visible sample must be decremented. In the illustrated embodiment, three clock cycles must be counted, instead of four. The correction logic circuit 60 generates a logic '1' signal on the -1 output terminal, and a logic '0' signal on the +1 output terminal. In response to this signal, the memory control circuit 70 counts three cycles of the burst locked clock signal CLOCK before storing the first visible sample.

Figure 8:
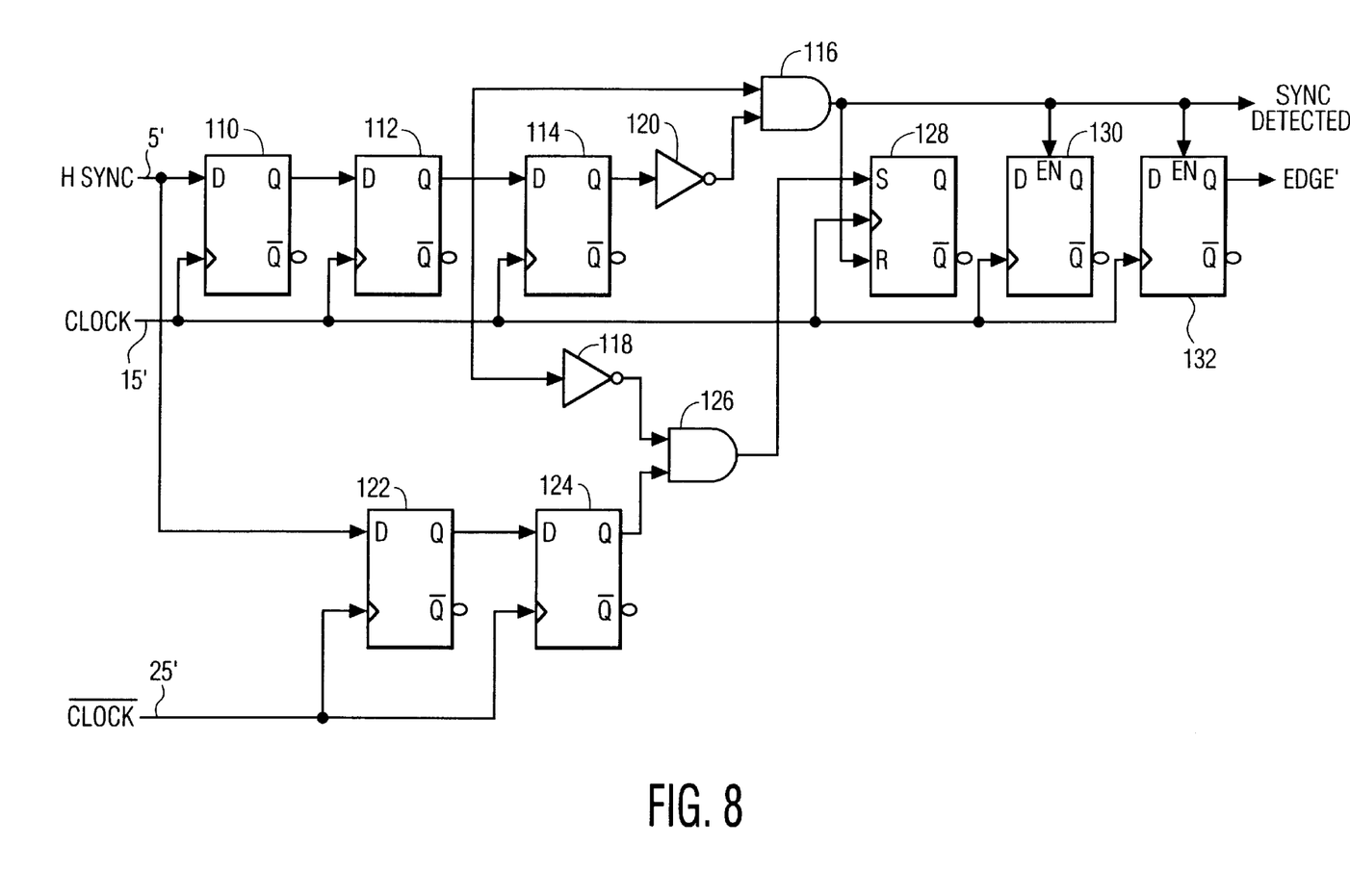
FIG. 8 is a more detailed block diagram of a preferred embodiment of the correction circuit illustrated in FIG. 3.

FIG. 8 is a more detailed block diagram of a preferred embodiment of the correction circuit illustrated in FIG. 4. In FIG. 8, the horizontal synchronization signal source (not shown) is coupled to an input terminal 5'. The burst locked clock signal source (also not shown) produces both a burst locked clock signal CLOCK and an inverted burst locked clock signal, indicated by the designation CLOCK with a line above it. The burst locked clock signal is coupled an input terminal 15', and the inverted clock signal is coupled to an input terminal 25'. Input terminal 5' is coupled to a D input terminal of a first D flip-flop 110. A Q output terminal of the first D flip-flop 110 is coupled to a D input terminal of a second D flip-flop 112. A Q output terminal of the second D flip-flop 112 is coupled to a D input terminal of a third D flip-flop 114, to a first input terminal of a first AND gate 116, and to an input terminal of a first inverter 118. A Q output terminal of the third D flip-flop 114 is coupled an input terminal of a second inverter 120, and an output terminal of the second inverter 120 is coupled to a second input terminal of the first AND gate 116.

The input terminal 5' is also coupled to a D input terminal of a fourth D flip-flop 122. A Q output terminal of the fourth D flip-flop 122 is coupled to a D input terminal of a fifth D flip-flop 124, and a Q output terminal of the fifth D flip-flop 124 is coupled to a first input terminal of a second AND gate 126. An output terminal of the first inverter 118 is coupled to a second input terminal of the second AND gate 126. An output terminal of the first AND gate 116 produces a SYNC DETECTED' signal, and is coupled to a reset input terminal R of an S-R flip-flop 128. An output terminal of the second AND gate 126 is coupled to a set input terminal S of the S-R flip-flop 128. A Q output terminal of the S-R flip-flop 128 is coupled to a D input terminal of a sixth D flip-flop 130, and a Q output terminal of the sixth D flip-flop 130 is coupled to a D input terminal of a seventh D flip-flop 132. A Q output terminal of the seventh D flip-flop 132 produces an EDGE' signal. The output terminal of the first AND gate 116 is also coupled to enable input terminals of the sixth and seventh D flip-flops 130 and 132, respectively. The SYNC DETECTED' and EDGE' signals are coupled to the other components illustrated in FIG. 4.

Input terminal 15' is coupled to respective clock input terminals of the first D flip-flop 110, the second D flip-flop 112, the third D flip-flop 114, the S-R flip-flop 128, the sixth D flip-flop 130 and the seventh D flip-flop 132. Input terminal 25' is coupled to respective clock input terminals of the fourth D flip-flop 122 and the fifth D flip-flop 124.

In operation, the first D flip-flop 110 is subject to the uncertainty condition described above. The combination of the first and second D flip-flops, 110 and 112 respectively, eliminates jitter conditions and performs the function of the first D flip-flop 10 in FIG. 4. That is, the combination of the first and second D flip-flops, 110 and 112 produce a signal corresponding to the SYNC DETECTED signal in FIGS. 1, 2, 3, 5, 6 and 7. In the illustrated embodiment, the SYNC DETECTED' signal is preferably a single burst locked clock signal CLOCK cycle in duration. The combination of the third D flip-flop 114, second inverter 120 and first AND gate 116 operate to generate a SYNC DETECTED' pulse which is a single burst locked clock signal CLOCK cycle in duration in a known manner. This SYNC DETECTED' pulse is supplied to the reset input terminal IR of the S-R flip-flop 128, as in FIG. 4.

In a similar manner, the combination of the fourth and fifth D flip-flops 122 and 124 eliminates jitter conditions, and performs the function of the second D flip-flop 20 in FIG. 4. That is, the combination of the fourth and fifth D flip-flops 122 and 124 detects the horizontal synchronization signal H SYNC at the trailing edge of the burst locked clock signal CLOCK, by using the inverted clock signal from input terminal 25' for their clock input signals. The combination of the first inverter 118 and second AND gate 126 performs the function of the AND gate 40 in FIG. 4, and the S-R flip-flop 128 performs the same function as the S-R flip-flop 50 in FIG. 4. The sixth and seventh D flip-flops 130 and 132 operate to synchronize the EDGE' signal to the burst locked clock signal and to delay the signal. The SYNC DETECTED' and EDGE' signals control the correction logic circuit 60, and memory controlling circuit 70 of FIG. 4, as described above.

What is claimed is:

1. A delay correction circuit, comprising:

a source of a clock signal;

a source of a timing signal asynchronous with the clock signal;

a timing signal detector, responsive to the clock signal and the timing signal, and properly operative only when the timing signal is stable for a predetermined time period around the clock signal;

a control circuit for conditioning utilization circuitry to operate after a delay time after the timing signal is detected; and an adjusting circuit for conditioning the control circuit to adjust the delay time if the timing signal was not stable within the predetermined time period.

2. The circuit of claim 1 wherein:

the clock signal source produces the clock signal having successive cycles, each cycle having a leading edge and a trailing edge;

the timing signal source produces the timing signal having a leading edge; and the adjusting circuit comprises:

circuitry for measuring the skew between the leading edge of the timing circuit, and the leading edge of an adjacent clock signal cycle;

circuitry for detecting the timing signal at a leading edge of the clock signal;

circuitry for detecting the timing signal at a trailing edge of the clock signal; and     circuitry to condition the control circuit to increase the delay time when the skew is less than a predetermined minimum and the timing signal was detected at the leading edge of the clock signal, and decrease the delay time when the skew is greater than a predetermined maximum and the timing signal was detected at the trailing edge of the clock signal.

3. The circuit of claim 2 wherein the control circuit is responsive to the clock signal, and conditions the utilization circuit to operate after a selected number of clock signal cycles after the timing signal is detected.

4. The circuit of claim 3 wherein the conditioning circuitry in the adjusting circuit conditions the control circuit to increment the selected number of clock cycles when the skew is less than a predetermined minimum and the timing signal was detected at the leading edge of the clock signal, and decrement the selected number of clock cycles when the skew is greater than a predetermined maximum and the timing signal was detected at the trailing edge of the clock signal.

5. The circuit of claim 2 wherein the skew measuring circuitry produces a signal representing the skew in terms of a fraction of a clock signal cycle.

6. The circuit of claim 5 wherein:

the circuitry for detecting the timing signal at a leading edge of the clock signal comprises a leading edge flip-flop having an input terminal coupled to the timing signal source, and a clock signal input terminal coupled to the clock signal source;

the circuitry for detecting the timing signal at a trailing edge of the clock signal comprises a trailing edge flip-flop having an input terminal coupled to the timing signal source, and an inverting clock signal input terminal coupled to the clock signal source; and the conditioning circuitry in the adjusting circuit comprises a circuit, responsive to the leading edge flip-flop, the trailing edge flip-flop, and the skew measuring circuitry, for conditioning the control circuit to increase the delay time when the skew is less than a predetermined minimum and the leading edge flip-flop detected the timing signal, and decrease the delay time when the skew is greater than a predetermined maximum and the trailing edge flip-flop detected the timing signal.

7. The circuit of claim 2 wherein the circuitry for detecting the timing signal at a leading edge of the clock signal comprises a flip-flop having an input terminal coupled to the timing signal source, and a clock signal input terminal coupled to the clock signal source.

8. The circuit of claim 2 wherein the circuitry for detecting the timing signal at a trailing edge of the clock signal comprises a flip-flop having an input terminal coupled to the timing signal source, and an inverting clock signal input terminal coupled to the clock signal source.

9. The circuit of claim 1 wherein:

the clock signal source produces the clock signal having successive cycles; and the control circuit is responsive to the clock signal, and conditions the utilization circuit to operate after a selected number of clock signal cycles after the timing signal is detected.

10. The circuit of claim 1 wherein the timing signal detector comprises a flip-flop having an input terminal coupled to the timing signal source, a clock input terminal coupled to the clock signal source, and an output terminal producing a signal when the timing signal is detected.

11. A delay correction circuit, comprising:

a source of a composite video signal including a horizontal synchronization signal component;

a source of a burst locked clock, synchronized to the composite video signal, and having successive cycles, each cycle having a leading edge and a trailing edge;

a circuit for detecting the horizontal synchronization signal at a leading edge of the burst locked clock signal;

a circuit for detecting the horizontal synchronization signal at a trailing edge of the burst locked clock signal;

a circuit for measuring the skew between the horizontal synchronization signal and the leading edge of an adjacent cycle of the burst locked clock;

a correction logic circuit, for generating an increment signal when the skew is less than a predetermined minimum and the horizontal synchronization signal is detected at a leading edge of the burst locked clock signal, and for generating a decrement signal when the skew is greater than a predetermined maximum and the horizontal synchronization signal is detected at a trailing edge of the burst locked clock signal; and a memory control circuit, for delaying:

one more than a predetermined number of cycles of the burst locked clock signal in response to the increment signal;

one less than the predetermined number of cycles of the burst locked clock signal in response to the decrement signal; and     the predetermined number of clock cycles otherwise, then storing successive samples representing the composite video signal in a frame store.

* * * * *